United States Patent Office 3,372,989
Patented Mar. 12, 1968

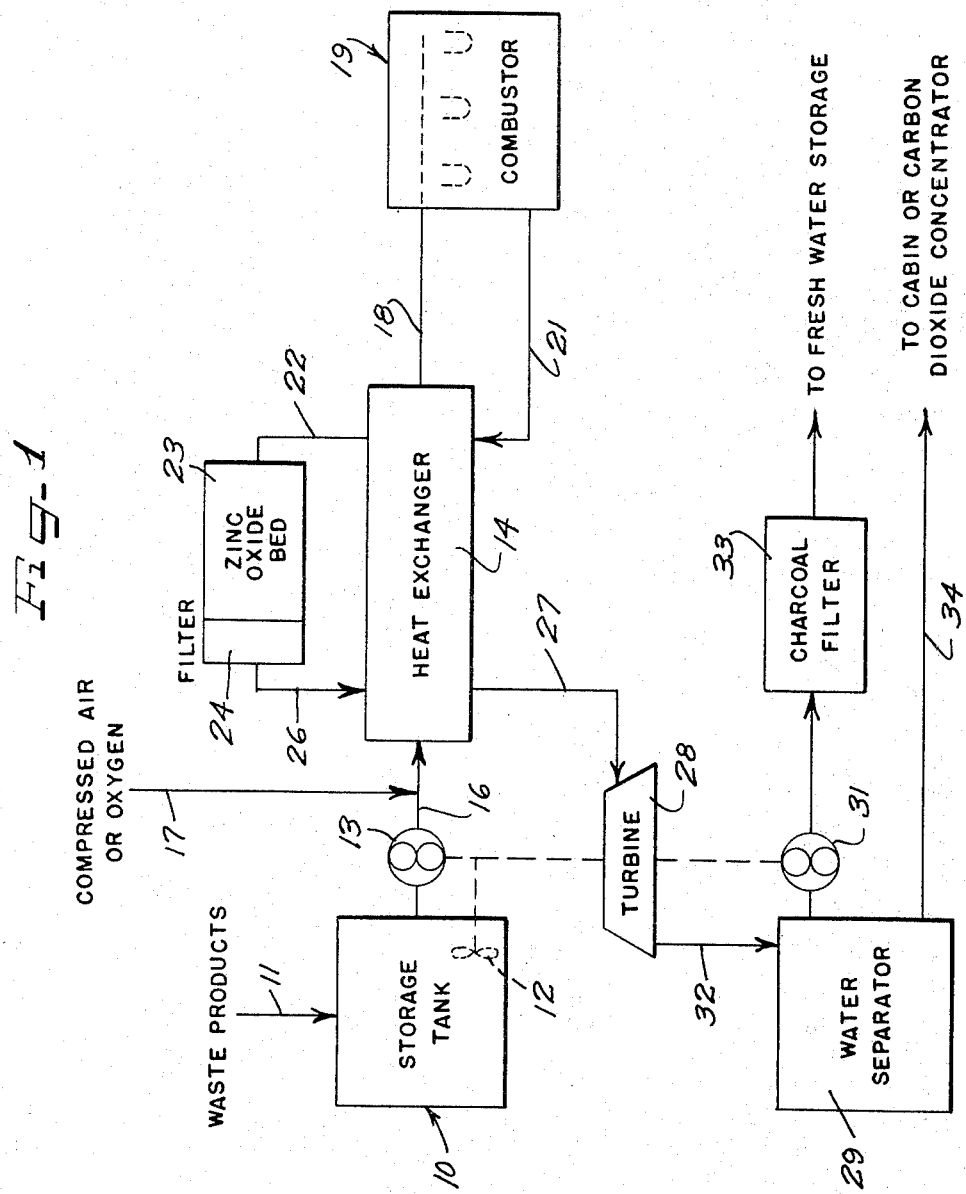

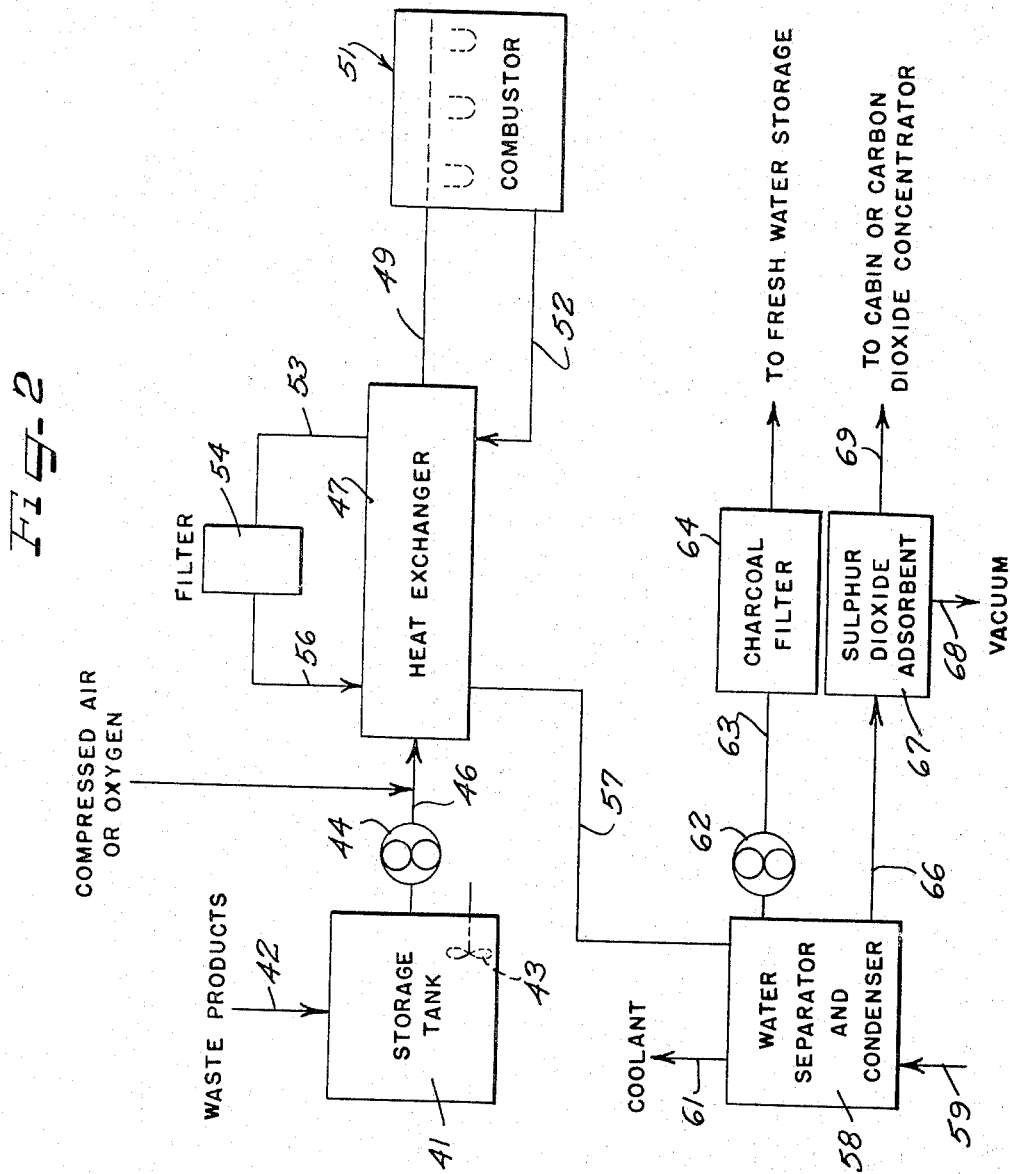

3,372,989
WASTE COMBUSTION AND WATER
RECOVERY SYSTEM
Martin R. Macklin, Cleveland, Ohio, assignor to
TRW Inc., a corporation of Ohio
Filed Apr. 1, 1964, Ser. No. 356,468
8 Claims. (Cl. 23—204)

ABSTRACT OF THE DISCLOSURE

Method and apparatus for recovering potable water from an organic waste product wherein the product is passed through a heat exchanger where it is heated sufficiently to volatilize the water present and to vaporize the organic volatiles, the vaporous mixture is then oxidized in a combustion zone, the combustion products are recirculated to the aforementioned heat exchanger, the combustion products are filtered and finally water vapor is condensed therefrom.

---

The present invention relates to a system for waste disposal, and more particularly, to a method and apparatus for recovering potable water from combustible organic waste materials.

The method and apparatus of the present invention are generally applicable to situations wherein potable water must be conserved, and where organic waste products must be disposed of. One of the areas in which the present invention finds use is that of vehicles having a limited water supply, such as house trailers, airplanes, and railway cars. The system of the present invention is also applicable to home use or a large scale industrial use where recovery of potable water from brackish or salt water is expensive. One area in which the present invention can be used to great advantage is that of supplying potable water to space craft while at the same time providing an efficient system for waste disposal in such craft.

An object of the present invention is to provide an improved method for efficient recovery of potable water from combustible organic waste products.

Another object of the invention is to provide a system for water recovery and power generation from the combustion of organic waste materials.

Still another object of the invention is to provide a vapor phase treating system for combustible organic waste products which permits substantially complete oxidation of the organic materials.

Still another object of the invention is to provide a combustion system for organic waste materials which does not require the removal of settled solids but in which a simple filtering step removes non-combustible materials.

A further description of the present invention will be made in conjunction with the attached sheets of drawings which, by way of illustration only, show the manner in which the system of the present invention can be utilized in providing potable water recovery for space craft.

In the drawings:

FIGURE 1 is a schemtic diagram illustrating one waste treatment system in accordance with the present invention; and FIGURE 2 is a schematic diagram of a somewhat modified form of the system shown in FIGURE 1.

As shown in the drawings:

In FIGURE 1, reference numeral 10 indicates generally a storage tank into which waste products are continuously or intermittently fed through an inlet line 11. A mixer 12 is provided to prevent settling of solids and maintain a more or less uniform dispersion in the tank 10. A pump 13 delivers the contents of the tank 10 to a regenerative heat exchanger 14 throuh a conduit 16. Also introduced into the heat exchanger 14 through a conduit 17 is a combustion supporting gas such as compressed air or pure oxygen.

The waste material entering the heat exchanger 14 consists predominately of water, organic combustibles, and ash. Typically, it may be at a temperature of about 88° F., and at a pressure of 15 pounds per square inch absolute. Where compressed air is used as the combustion supporting gas, the mixture entering the heat exchanger 14 consists predominately of the water, combustibles and ash of the waste product, combined with the nitrogen and oxygen of the compressed air. The temperature at the inlet end of the heat exchanger may typically be 90° F., and the pressure about 80 pounds per square inch absolute.

In the regenerative heat exchanger 14, the mixture of waste product and air is heated to a temperature sufficient to vaporize substantially completely the water contained in the waste product and to partially vaporize the organics present. The vaporous mixture (containing the ash particles suspended therein) leaves the heat exchanger through a conduit 18 at a temperature of at least 700° F., and usually at a temperature between 900 and 1000° F. Typically, the material in the conduit 18 may be at a temperature of about 935° F. and at a pressure of 75 pounds per square inch absolute.

The vaporous mixture and remaining solid combustibles in the conduit 18 is then directed to a combustor generally indicated at reference number 19 in the drawings. Here, the material is oxidized completely to eliminate all of the organic combustibles, while generating carbon dioxide, and usually some sulfur dioxide from the combustile materials. Temperatures in this stage are at least 1000° F., and they extend to 1700° F. or so. A typical temperature is 1495° F., and a pressure of 70 pounds per square inch absolute.

The combustor 19 may include an ignitor and/or heater to initiate combustion, after which the reaction is generally self-sustaining. To insure efficient combusion, the inlet to the combustor may include swirl vanes or other devices to assure turbulence in the combustion zone. In addition, secondary combustion air may be added to assure maximum combustion efficiency.

The combustion products from the combustor 19 are transferred, via a conduit 21 back into the heat exchanger 14 for countercurrent heat transfer with the incoming mixture of waste product and combustion supporting gas being fed to the heat exchanger 14. At a point where the stream temperature is approximately 700° F., the combustion gases are routed out of the heat exchanger through a line 22 where they pass throuh a zinc oxide bed 23 for the removal of sulfur dioxide. The zinc oxide bed is located at this point since the desired reaction of zinc oxide with sulfur dioxide occurs best at about 700° F. After the passage through the zinc oxide bed 23, the suspension of ash particles is filtered through a filter 24 where the dry solids are completely removed from the mixture of water vapor, carbon dioxide, nitrogen, and oxygen which remains.

The temperature of the stream leaving the filter 24 is typically 700° F., and it is at a pressure of about 62 pounds per square inch absolute. It is then re-introduced into the heat exchanger 14 through a conduit 26 and ultimately emerges from the heat exchanger through a conduit 27. In the conduit 27, the temperature may be about 228° F., and the pressure about 60 pounds per square inch absolute. The stream in conduit 27 contains both water vapor and water condensed in heat exchanger 14.

In the embodiment shown in FIGURE 1 of the drawings, a turbine 28 is used to abstract work from the fluid stream before it enters a water separator 29. The turbine 28 is used to drive the mixer 12, the pump 13 and a pump 31 which delivers water from the water separator 29 to the filter, as will be described subsequently.

After abstraction of a substantial amount of the energy of the fluid stream, the stream passes by means of a conduit 32 into the water separator 29. The temperature of the stream in the conduit 32 may be about 200° F., and the pressure about 20 pounds per square inch absolute. In the water separator 29, the water vapor may be condensed and then pumped out by means of the pump 31 to a charcoal filter 33 which removes the last traces of impurities. The filtrate from the charcoal filter 33 is then passed to the fresh water storage supply. The temperature of the water entering the filter 33 may be on the order of 200° F., and the pressure of 17 pounds per square inch absolute. The carbon dioxide separated from the water in the separator 29 is discharged by means of a conduit 34 (together with the oxygen and nitrogen) and may be passed directly back to the cabin for mixing with the cabin air or it may be directed to an environmental control system for cooling and reduction of carbon dioxide concentration. This gas stream may typically be at a temperature of 200° F., and at a pressure of about 17 pounds per square inch absolute.

The system shown in FIGURE 2 is similar in many respects to that shown in FIGURE 1, but differs therefrom in the manner of sulfur dioxide removal. The system of FIGURE 2 includes a storage tank 41 into which the waste products are fed by means of an inlet line 42. A mixer 43 is incorporated in the storage tank 41 to prevent stratification. A pump 44 delivers the contents of the storage tank 41 through a conduit 46 to a regenerative heat exchanger 47. The temperature of the material in the tank 41 may typically be about 89° F., and at a pressure of one atmosphere. Compressed air or oxygen is introduced through a line 48 to mix with the waste product passing through the heat exchanger 47. At the inlet to the heat exchanger 47, the temperature may be 90° F. or so, and the pressure about 30 pounds per square inch absolute. In the heat exchanger 47, the water and the combustible organics are completely volatilized, and leave through an exit conduit 49 at a temperature on the order of 935° F., and at a pressure of 28 pounds per square inch absolute. These volatilized products are then passed to a combustor 51 which receives all of its required thermal energy by the heat of combustion of the organics and by heat exchange with the products of combustion. These combustion products leave the combustor 51 through a conduit 52 for countercurrent heat exchange with the materials entering the heat exchanger. In the conduit 52, the temperature may by typically 1495° F., and the pressure about 23 pounds per square inch absolute. Ash particles are filtered from the stream by passing the stream through a conduit 53 and a filter 54, whereupon the ash-free vapors are then reintroduced into the heat exchanger 47 by means of a conduit 56. At this point the temperature of the stream may be 700° F., and the pressure about 20 pounds per square inch absolute. The stream of water vapor and non-condensable gases is withdrawn from the heat exchanger through a conduit 57 and passes to a water separator and condenser 58. A coolant is circulated through the separator and condenser 58, the coolant being introduced through an inlet line 59 and exiting through an outlet line 61.

The water is condensed in the separator and condenser 58, and a pump 62 then delivers the water through a conduit 63 into a charcoal filter 64. A temperature of the water entering the filter 64 is typically 50° F., and the pressure about 17 pounds per square inch absolute. After passage through the charcoal filter 64, the potable water may be directed to the fresh water storage station.

Non-condensables leave the water separator and condenser through a conduit 66 and are then directed to a sulfur dioxide adsorbent stage 67. The temperature of the non-condensable gases is on the order of 50° F. when leaving the condenser, and the pressure about 17 p.s.i. absolute. The sulfur dioxide adsorbent may be a synthetic zeolite or silicia gel. Since these materials have preferential adsorption of water vapor, the stream must first be dried to prevent poisoning the adsorbent bed with water. Accordingly, two adsorbent beds are used, with one on stream while the other is being desorbed to space vacuum by means of a line 68. The purified mixture of carbon dioxide, nitrogen, and oxygen may then be recirculated to the cabin or to a carbon dioxide concentrator through a line 69.

Other systems for adsorbing sulfur dioxide may, of course, be used in place of the zinc oxide bed 23 in FIGURE 1 or the adsorbent 67 in FIGURE 2.

From the foregoing, it will be seen that the system of the present invention provides an efficient means for recovering potable water from waste products, while generating useful work in the process. By conducting the combustion of the waste products in the manner described, the non-combustibles can be more readily separated from the fluid stream than has heretofore been accomplished. Since the non-combustibles are the only non-vaporous materials in the system, they can be removed easily by filtration, which is considerably easier than the removal of settled solids in other types of waste combustion systems. Furthermore, by conducting the operation in the vapor state, all of the organics can be efficiently burned whereas in liquid reactor systems, less than complete combustion is always experienced.

It should be evident that various modifications can be made to the described embodiments without departing from the scope of the present invention.

I claim as my invention:

1. The method of recovering potable water from an organic waste product which comprises directing a mixture of said waste product and a combustion promoting gas to a regenerative heat exchanger, heating said mixture in said heat exchanger to a temperature sufficient to vaporize completely the water contained in said waste product and to vaporize the volatile organics present, burning the resulting vaporous mixture at an elevated temperature to form combustion products including sulfur dioxide, returning the combustion products to said regenerative heat exchanger into heat exchange relationship with the mixture of waste products and combustion supporting gas being fed thereto, filtering ash from the combustion products, and condensing water vapor in the resulting filtrate.

2. The method of claim 1 in which sulfur dioxide is separated from the combustion products prior to the condensation of the water vapor therein.

3. The method of claim 1 in which said sulfur dioxide is separated from the combustion products subsequent to the condensation of the water vapor therein.

4. An apparatus for recovering potable water from an organic waste product which comprises a regenerative heat exchanger, means for passing both an organic combustible waste product and a combustion supporting gas through said heat exchanger, a combustor receiving vaporized materials from said heat exchanger for combustion therein, means for directing the combustion products from said combustor back through said heat exchanger for countercurrent passage in heat exchange relationship with the waste product and combustion supporting gas passing therethrough, filter means receiving the combustion products from said heat exchanger, and condenser means receiving the filtered combustion products.

5. An apparatus for recovering potable water from an organic waste product which comprises a regenerative heat exchanger, pump means delivering an organic combustible waste product to said heat exchanger, means for introducing the combustion supporting gas to said heat exchanger in admixture with said waste product, a combustor receiving the vaporized mixture from said heat exchanger, means for delivering combustion products from said combustor back to said heat exchanger for heat transfer with the mixture of waste products and combustion supporting gas, a prime mover driving said pump means, means directing the combustion gases leaving said heat exchanger into said prime mover to operate the same, and water separator means receiving the effluent from said prime mover.

6. The apparatus of claim 5 including a solids filter receiving the combustion products for removing solids therefrom.

7. The apparatus of claim 5 including a solids filter and a sulfur dioxide adsorbent interposed between said heat exchanger and said water separator means.

8. An apparatus for recovering potable water from an organic waste product which comprises a regenerative heat exchanger, means for passing both an organic combustible waste product and a combustion supporting gas through said heat exchanger, a combustor receiving the volatiles from said heat exchanger, means for returning combustion gases from said combustor back to said heat exchanger for heat transfer with the mixture of waste products and combustion supporting gas, a solids filter connected to said heat exchanger and arranged to filter solids from said combustion gases, a water separator receiving the filtered combustion gases leaving said heat exchanger, and a sulfur dioxide adsorbent receiving non-condensable gases from said water separator.

References Cited

UNITED STATES PATENTS

| | | | |
|---|---|---|---|
| 2,314,827 | 3/1943 | Hortvet | 23—220 |
| 3,127,243 | 3/1964 | Konikoff | 23—204 |

OTHER REFERENCES

Sneed et al.: Comprehensive Inorganic Chemistry, D. Van Nostrand Co., Inc. New York, 1955, p. 62, vol. 4.

OSCAR R. VERTIZ, *Primary Examiner.*

EARL C. THOMAS, *Examiner.*

H. S. MILLER, *Assistant Examiner.*